May 21, 1935. L. B. KIMBALL 2,002,483
METHOD FOR AUTOMATIC CONTROL OF ANTIKNOCK LIQUIDS
Original Filed Jan. 20, 1934 2 Sheets-Sheet 1

INVENTOR
Leo B. Kimball
BY Sheffield & Betts
HIS ATTORNEYS

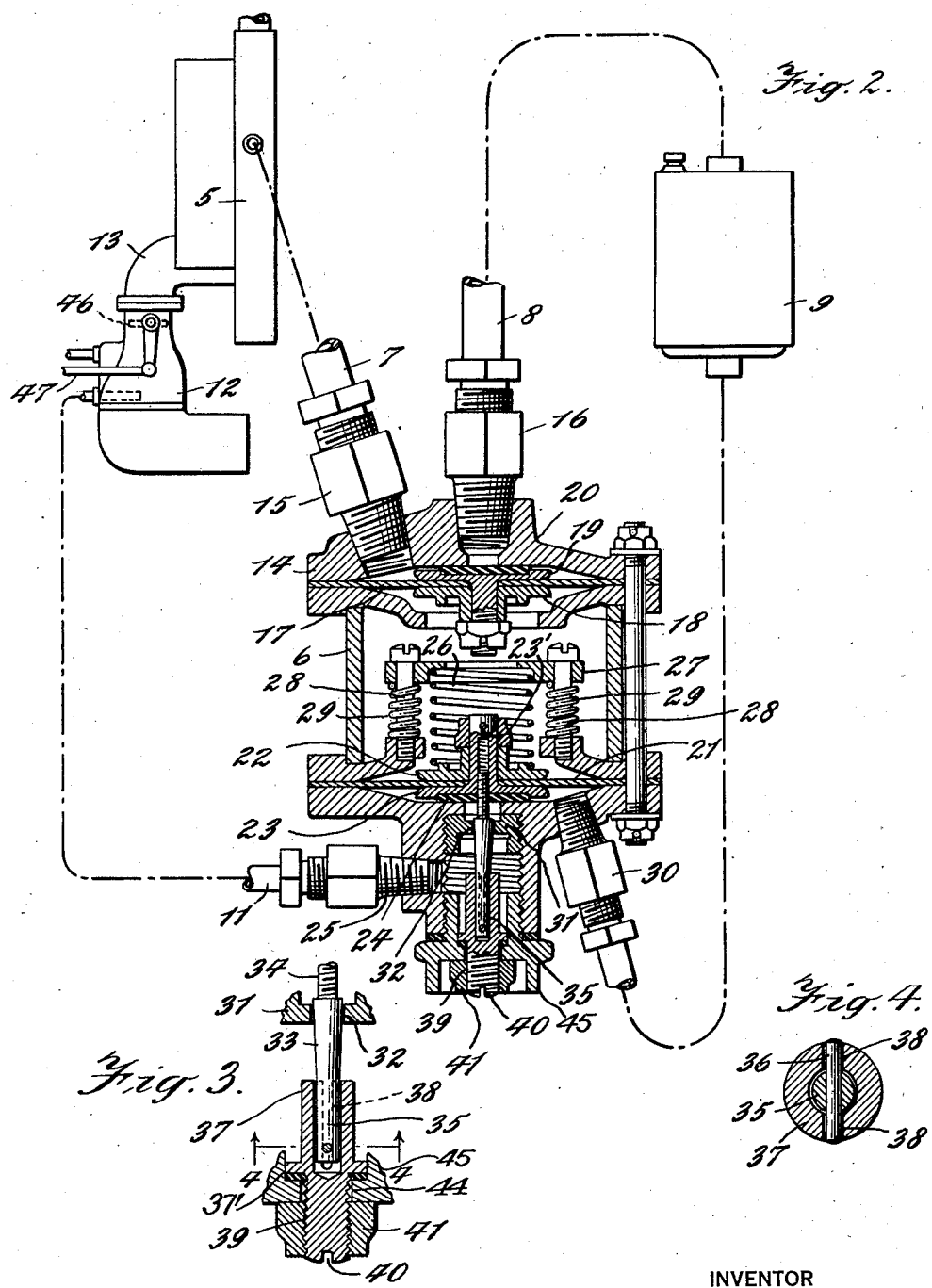

Patented May 21, 1935

2,002,483

UNITED STATES PATENT OFFICE 2,002,483

METHOD FOR AUTOMATIC CONTROL OF ANTIKNOCK LIQUIDS

Leo B. Kimball, New Haven, Conn., assignor to Fuel Development Corporation, a corporation of Delaware Original application January 20, 1934, Serial No. 707,550. Divided and this application March 7, 1934, Serial No. 714,442

8 Claims. (Cl. 123—119)

This invention relates to certain improvements that pertain primarily to the fractional supply of anti-knock liquids to the intake conduits or apparatus of an internal combustion engine or to engines of similar nature, for distribution in the air-fuel mixtures used in the operation thereof.

This application is a division of my prior application filed January 20, 1934, Serial No. 707,550.

The invention of this application has more particularly to do with the method used for the supply of anti-knock liquids to internal combustion engines which are used with a so-called "supercharger", which has usually been in the form of a blower, or there may be other devices for producing a pressure in the intake of an internal combustion engine above normal atmospheric pressure.

Although such superchargers have been used to some extent in connection with automobile engines, yet their use in connection with airplane or aircraft engines is particularly valuable because when an airplane is "taking off" the power required of the engine is above the normal power that would ordinarily be produced with a wide open throttle valve.

One object, therefore, of the present invention is to make certain changes in the method heretofore invented by me for the fractional supply of fluids to internal combustion engines, such as is described in my prior Patent No. 1,974,072, issued September 18, 1934. In said patent the general considerations surrounding the operation of internal combustion engines and the reason for adding anti-knock liquids thereto at certain times are fully set forth, and it is deemed unnecessary to repeat the same in this specification.

It may be said, in addition thereto, that in the use of a supercharger with aircraft engines, the supercharger produces an increased pressure which sometimes may amount to one atmosphere above normal atmospheric pressure at sea level. When an airplane takes off from the ground or water surface at practically sea level, the pilot opens the throttle valve to some predetermined point approaching its widest opening. Owing to the high speed of the airplane engine at such times the supercharger (or blower) produces an increased pressure in the intake manifold of the engine. At such times the tendency to produce knocking in the engine is increased, particularly if the gasoline is of low grade or the engine has become foul from carbon or a poor condition is produced from other causes.

As the airplane attains greater elevation the additional intake pressure produced by the supercharger becomes somewhat neutralized by the drop in atmospheric pressure and the pilot therefore opens the throttle to a somewhat greater extent, which causes the supercharger to produce still more pressure and so to increase the power and speed of the engine in order to cause the aircraft to continue to rise steadily.

When the desired cruising altitude is reached the throttle is somewhat closed so that it is usually about three-fourths of its maximum opening and this is continued at the cruising speed, after which it is not necessary to change the position of the throttle except under adverse or unexpected conditions.

At cruising speeds of an aircraft, the supercharger or blower produces no pressure in the intake, that is, the effective result thereof may be equal to or below atmospheric pressure at sea level. Such speeds, in cruising, are substantially normal speeds of the aircraft, and therefore, since no considerable extra power is required, the fuel-air mixture or charge is substantially normal and the intake suction of the engine supplemented by the supercharger pressure to overcome the reduced air pressure supplies the necessary charge to practically the same degree as would occur at sea level.

As above stated, the knocking tends to occur only at times when considerable extra power is required of the engine, such as when taking off or rising to higher altitudes. Consequently, it becomes necessary only to supply the anti-knock liquid at such times.

This invention, therefore, resides in methods for adding the anti-knock liquid economically when used with a supercharger or blower connected with an engine, and also when used with automobile engines where such valves are installed as a part of the automobile equipment. The installation for automobile uses of the valve and with a supercharger is not substantially different from the use of the valve with an aircraft supercharger, the main differences in the first case being in the type of engine used and in the kind of supercharger employed.

For a detailed description of one form of apparatus for carrying out this invention and which at present is deemed preferable, reference may be had to the following specification and the drawings forming part thereof, in which Figure 1 is a side elevation of an airplane engine showing the relative locations of the respective parts and their connections with each other;

Figure 2 is a schematic diagram of the apparatus shown in Figure 1, the valve itself being shown in cross-section to indicate the relative positions of the parts thereof;

Figure 3 is a vertical cross-sectional view of the lower part of the valve shown in Figure 2; and Figure 4 is a cross-sectional view, substantially horizontal, taken on the line 4—4 of Figure 2.

Figure 1:
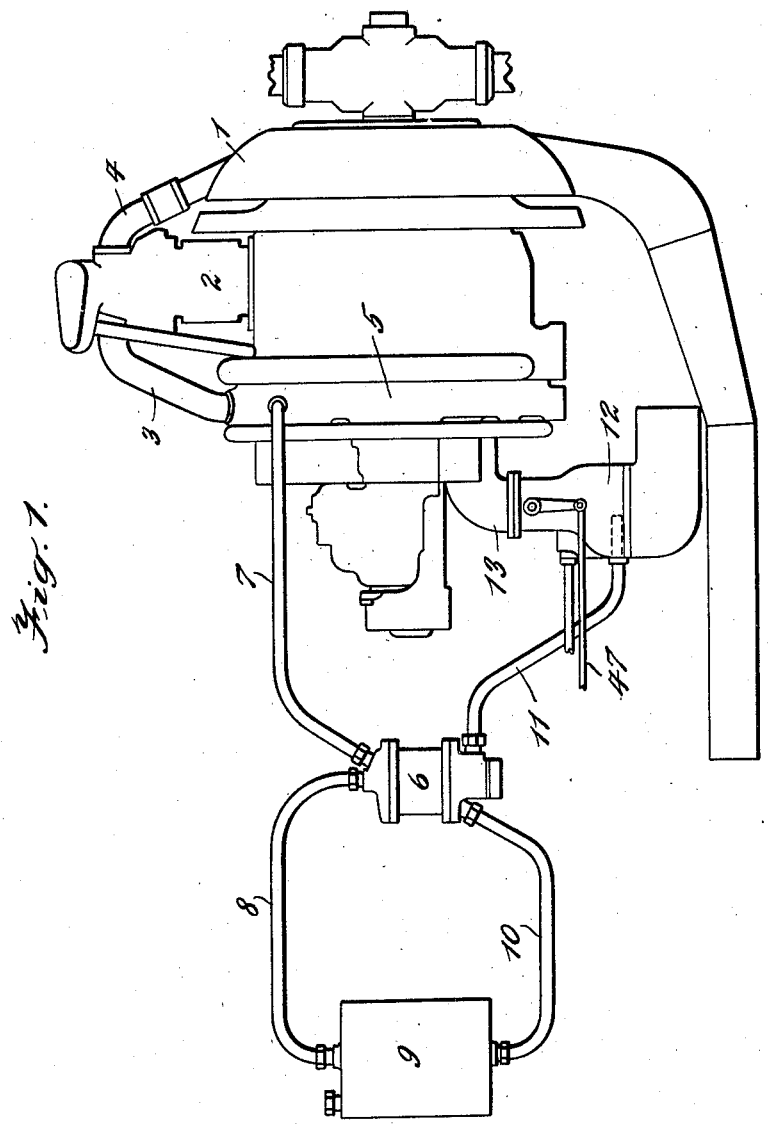

Referring particularly to Figure 1 of the drawings, the numeral 1 indicates the airplane engine which has a multiplicity of radially located cylinders, such as indicated by the numeral 2. The pistons in these cylinders are connected with the main crank, as is usual in such devices, and the cylinders are also provided with intake and exhaust pipes, as indicated by the numerals 3 and 4, respectively.

At the left hand of the crank case is a circular housing 5 which contains the rotating pump or blower constituting the supercharger, the rotating part of said blower being operated from the crank shaft of the engine or from a rotating device driven from the exhaust pressures of the engine, as is well known in the art. Obviously, the supercharger may be driven by other means when preferred.

The improved valve which I have invented for use in connection with this type of apparatus is indicated by the numeral 6. The numeral 7 indicates a pipe leading from the supercharger casing 5 to said valve. The pipe 8 is a pipe leading from said valve to a closed reservoir or supply tank 9 for the anti-knock liquid. From the bottom of the reservoir 9 is a pipe 10 which leads to the valve 6 and through which the anti-knock liquid passes so that it is controlled by said valve. From the lower part of the valve is a pipe 11 that is connected with the carburetor 12. This carburetor 12 is connected with the supercharger or blower by a suitable pipe 13 so that the air-fuel mixture passes through said supercharger to the intake pipes which lead to the compression ends of the cylinders of the engine.

Referring now to Figure 2, in which the above mentioned parts are indicated schematically, it will be seen that the various pipes are connected with the valve 6 as above described, so that it will operate to perform its required functions when constructed as follows:

The top of the casing or housing 14 is provided with a union or nipple 15 with which the pipe 7 from the supercharger 5 is connected. A second nipple 16 entering the top of the housing 14 is connected with the pipe 8, from the supply tank 9. Below the top of the housing 14, there is a resilient diaphragm 17 which carries two discs 18 and 19, the upper disc being provided with a flexible washer or gasket 20 which is adapted to close the opening in the top of the housing that is located immediately below the nipple 16.

In the lower part of the housing 14 a second diaphragm is provided as indicated at 21. This is also provided with two circular discs 22 and 23, the lower one of which also carries a packing or gasket 24 which is adapted to close the outlet 25 in the bottom of the housing. The circular disc 22 supports one end of a helical spring 26, the upper end of which is held in position by the annular cap 27, which cap is supported on screw-threaded posts or studs 28. The cap is held adjustably in position by the helical springs 29 surrounding said studs. The spring 26 tends to hold the gasket 24 in contact with the lower end of the housing so as to close the outlet 25 except when the necessary counterbalancing fluid pressure is active to raise the same. This pressure is supplied through the nipple 30 which connects with the pipe 10 leading to the bottom of the supply tank or reservoir 9. The air pressure in the space between the diaphragm 17 and the diaphragm 21 is preferably maintained at normal atmospheric pressure (at sea level) and since the air constitutes a resilient cushion its pressure is effective to aid in determining the points at which the respective valves open. Beneath the outlet 25 in the housing 14 is a thimble 31 which is screw-threaded within a suitable opening, and said thimble is provided with a transverse partition having a hole or opening therein, as indicated at 32. Within the opening 32 is a valve member 33 having varying transverse diameters which determine the rates at which the liquid will flow through the opening 32. This valve member 33 is provided with a screw-threaded projection 34 which passes through the disc 23 and is adjustably carried in the hub thereof 23'.

Below the tapering portion of the valve member 33 is a cylindrical portion 35 which is provided at its lower end with a transverse pin 36. A tubular member 37 is provided with longitudinal slots 38 within the ends of the pin 36 may slide up and down. The tubular portion 37 is continued downward and is screw-threaded as indicated at 39 and is provided with a groove 40 for turning by means of a screw-driver.

The screw-threaded portion 39 is preferably provided with a locknut 41 which may be used to hold the flange 37' of the tubular portion 37 in its adjusted position on the flange 44 of the thimble 45. It will now be seen that when the screw-threaded portion 39 is rotated by means of a screw-driver the cylindrical portion 35 of the valve spindle and the tapering portion 33 thereof will be raised or lowered with reference to the opening 32 so that the rates of flow of liquid through said opening can be adjusted to cover the required range for the correct flow of anti-knock liquid under various requirements of the engine. I do not wish to be understood as being limited to this particular form of adjusting means above described, although the same is quite similar to that illustrated and described in my prior patent above referred to.

Referring to Figure 2 and supposing the throttle valve of the engine is opened for taking off from the surface of the earth or a water surface, the supercharger or blower will produce the necessary pressure above atmospheric pressure so that the mixture of fuel and air will be impelled or driven into the intake passages of the engine by a pressure that is above normal atmospheric pressure. This will increase the pressure through the pipe 7, nipple 15 and the space above the diaphragm 17. Thus the diaphragm will be pushed downward and the orifice below the nipple 16 will be opened so that the pressure can pass through the nipple 16, pipe 8, to the upper portion of the reservoir 9. That pressure will then cause the liquid therein to be forced out from the bottom thereof so that it will pass through the pipe 10 and the nipple 30 into the space below the diaphragm 21 and such pressure on the diaphragm will cause the gasket 24 to be raised and so open the discharge outlet 25. That also causes the liquid to pass through the opening 32 surrounding the valve member 33. This member constitutes a metering device which will accurately determine the rates of flow of the anti-knock liquid into the chamber below said transverse partition in the thimble 31. The amount of variation in the diameter of the valve member 33 should be accurately determined in order that the rates of flow of the liquid controlled thereby will correspond to the desired amount that it is necessary to add to the air-fuel mixture. The variations in the valve member are determined by the amount of anti-knock or other fluid required to be added at various supercharger pressures throughout the range of supercharger pressures and according to the requirements of the engine. Thus the liquid will flow through the nipple 42 and the pipe 43 to the carburetor 12 where it is mixed with the incoming air and when mixed with the fuel, passes through the pipe 13 to the supercharger 5. It then flows to the cylinders of the engine through the intake pipes 3.

Regarding the adjustment of the valve member 33 having varying diameters in the opening 32 through the partition in the nipple 31, that is accomplished, as above indicated, first, by loosening the locknut 41 so that the tubular portion 37 may be rotated. Then by rotating the tubular portion 37 in a clockwise direction the valve member 33 will be raised by reason of its being screwed further into the hub 23' extending from the disc 23. When the proper position has been reached, the screw-driver is removed and the locknut again screwed into position so that the flange 37' will be pulled down onto the internal flange 44 of the screw-threaded thimble 45 which closes the lower end of the housing 14. Thereafter, the tubular portion 37 will not be further rotated until the locknut 41 is again loosened.

It may be stated here that the position of the valve spindle 33, as relates to the disc 23, will be slightly higher for high powered engines than it is when used in connection with other engines of smaller power, since higher powered engines require more fuel.

As is usual in connection with aircraft engines similar to those above described, as well as in connection with engines for propelling automobiles, the carburetor is provided with a throttle valve which, in the present instance, is indicated above the carburetor 12, at 46. This throttle valve is one of the usual accessories supplied with such aircraft or automobile engines and is connected with the device to be controlled by the operator of the engine through a rod 47, in any manner known in the art.

Having thus described this arrangement of one form of my improved valve as relates to the method of using the supercharger and the carburetor of an aircraft engine, it will be seen that I have provided a method that is carried out in connection with the control by the operator of the throttle valve for determining the amount of fuel to be supplied to an internal combustion engine. This arises by reason of the fact that the supercharger produces the additional pressure in proportion to the speed and power required of the engine. The speed of the engine determines the speed of rotation of the rotating element of the supercharger, and therefore its supercharging or fluid pressure action.

It will be appreciated that the positive control comes into play primarily when the aircraft is taking off from the surface of land or water and the valves automatically provide the necessary supply of anti-knock liquid in accordance with the extra unusual power demanded of the engine.

It will be apparent from the above description that the use of a "supercharger" may not always be required. The pressure on the surface of the supplementary liquid in the reservoir may be produced in other ways. When the usual exhaust pressure from an internal combustion engine is sufficiently high the exhaust passages of the engine may be connected by a conduit with the upper portion of the reservoir and the valve for controlling the pressure in said conduit may or may not be inserted, depending upon the operating characteristics of the engine.

It will also be apparent that the valve for controlling the pressure on the supplementary liquid may be omitted even where the pressure is produced by a supercharger or similar pressure device.

Also, said supercharger pressure valve may be operated mechanically, as simultaneously with the throttle valve if such an arrangement be desirable.

I wish it to be understood that I do not wish this invention to be considered as being limited to the specific details and procedure herein described, except in so far as they may be consistent with the scope and tenor of the accompanying claims, for various changes may be made without departing from the spirit of my invention.

What I claim and desire to protect by Letters Patent is:

1. The method of supplying a supplementary liquid in varying amounts for distribution in the air-fuel mixtures used in operating an internal-combustion engine, which comprises, producing a fluid pressure above atmospheric pressure in substantial proportion to the power developed by the engine, causing said fluid pressure to act elastically upon the surface of said supplementary liquid and impel the same to flow in the desired direction, and then regulating the rates of flow of said supplementary liquid in proportion to the fluid pressure on the same.

2. The method of supplying a supplementary liquid in varying amounts for distribution in the air-fuel mixtures used in operating an internal-combustion engine, which comprises, producing a positive fluid pressure in proportion to the power developed by the engine, said pressure being above that of the surrounding atmosphere, causing said fluid pressure to act elastically upon the surface of said supplementary liquid and impel the same to flow in the desired direction, regulating the rates of flow of said supplementary liquid in proportion to the fluid pressure thereon and in proportion to the extra power developed by the engine, and stopping the flow thereof when said fluid pressure is below a predetermined pressure.

3. The method of supplying a supplementary liquid in varying amounts for distribution in the air-fuel mixtures used in operating an internal-combustion engine, which comprises, producing a positive air pressure in proportion to the power and speed developed by the engine, causing said air pressure to act upon the surface of a substantial quantity of said supplementary liquid to force the same to flow therefrom in the desired direction, regulating the rates of flow of said supplementary liquid in proportion to the air pressure thereon and in proportion to the power and speed developed by the engine, and discontinuing said air pressure and said flow of fluid when said engine is operating to develop cruising power and speed.

4. The method of supplying a supplementary liquid in varying amounts for distribution in the air-fuel mixtures used in operating an internal-combustion engine, which comprises, controlling the main stream of air-fuel mixtures to increase or decrease the power and speed of said engine, causing said engine to produce a positive air pressure in proportion to the power developed thereby, causing said air pressure to act upon the surface of a substantial quantity of said supplementary liquid to force the same to flow therefrom in the desired direction, regulating the rates of flow of said liquid in proportion to the fluid pressure thereon and in proportion to the power and speed developed by the engine, and discontinuing said fluid pressure and said flow of said liquid when said engine is operating to develop cruising power and speed.

5. The method of supplying an anti-knock liquid varying amounts for distribution in the air-fuel mixtures used in operating an internal combustion engine, which comprises, forcing said anti-knock fluid into the air-fuel mixtures under positive air pressures above atmospheric pressure and regulating the rates of flow of said anti-knock liquid in proportion to the various amounts of power required of the engine.

6. The method of supplying an anti-knock liquid in varying amounts for distribution in the air-fuel mixtures used in operating an internal combustion engine, which comprises, producing a positive fluid pressure above atmospheric pressure and in substantial proportion to the power developed by the engine, causing said fluid pressure to act upon said anti-knock liquid to force the same into the air fuel mixtures constantly at certain speeds of the engine, and regulating the rates of flow of aid anti-knock liquid in proportion to the various amounts of power required of the engine.

7. The method of supplying an anti-knock liquid in varying amounts for distribution in the air-fuel mixtures used in operating an internal combustion engine, which comprises, producing a positive air pressure that is above atmospheric pressure and in varying proportions corresponding to the various amounts of power required of the engine, causing said air pressure to act upon said anti-knock liquid to force the same into the air-fuel mixtures, and then regulating the rates of flow of said anti-knock liquid in proportion to the varying amounts of power required of the engine.

8. The method of supplying an anti-knock liquid in varying amounts for distribution in the air-fuel mixtures used in operating an internal combustion engine, which comprises, producing a positive air pressure above atmospheric pressure and in proportion to the power developed by the engine, causing said air pressure to act upon said anti-knock liquid to force the same into the air-fuel mixtures, regulating the rates of flow of said anti-knock liquid in proportion to the various amounts of power required of the engine, and stopping the flow of said anti-knock liquid when the air pressure thereon is below a predetermined amount.

LEO B. KIMBALL.

CERTIFICATE OF CORRECTION.

Patent No. 2,002,483.                                           May 21, 1935.

LEO B. KIMBALL.

It is hereby certified that error appears in the printed specification of the above numbered patent requiring correction as follows: Page 4, first column, line 15, claims 5, before "varying" insert the word in; and second column, line 1, claim 6, for "aid" read said; and that the said Letters Patent should be read with these corrections therein that the same may conform to the record of the case in the Patent Office.

Signed and sealed this 25th day of June, A. D. 1935.

Bryan M. Battey (Seal)                                                                 Acting Commissioner of Patents.